United States Patent [19]

Toh et al.

[11] 4,220,625
[45] Sep. 2, 1980

[54] EXHAUST GAS CONTROL EQUIPMENT

[75] Inventors: Tagao Toh; Kazuo Iwaoka, both of Toyonaka, Japan

[73] Assignee: Matsushita Electric Industrial Co., Ltd., Osaka, Japan

[21] Appl. No.: 45,775

[22] Filed: Jun. 5, 1979

Related U.S. Application Data

[63] Continuation of Ser. No. 843,505, Oct. 18, 1977, abandoned.

[30] Foreign Application Priority Data

Oct. 20, 1976 [JP] Japan .................................. 51-126576
Oct. 20, 1976 [JP] Japan .......................... 51-141775[U]
Dec. 1, 1976 [JP] Japan .......................... 51-161747[U]

[51] Int. Cl.² .......................... B01J 35/04; B01J 8/02; F01N 3/15
[52] U.S. Cl. .................................. 422/180; 422/177; 252/477 R
[58] Field of Search ............... 422/171, 172, 177, 179, 422/180, 211, 222; 252/477 R

[56] References Cited

U.S. PATENT DOCUMENTS

| | | | |
|---|---|---|---|
| 3,189,563 | 6/1965 | Hauel | 422/177 |
| 3,208,131 | 9/1965 | Ruff et al. | 422/222 |
| 3,597,165 | 8/1971 | Keith et al. | 422/180 |
| 3,770,389 | 10/1973 | Kitzner et al. | 422/180 X |
| 3,773,894 | 11/1973 | Bernstein et al. | 422/180 X |
| 3,811,845 | 5/1974 | Nakamura | 422/173 |
| 3,819,334 | 6/1974 | Yoshida et al. | 422/180 X |
| 3,897,366 | 7/1975 | Nakamura | 252/477 R |
| 3,929,671 | 12/1975 | Nakamura | 252/477 R |
| 3,956,185 | 5/1976 | Yagi et al. | 252/477 R |
| 4,078,898 | 3/1978 | Fedor et al. | 422/180 X |

Primary Examiner—Barry S. Richman
Attorney, Agent, or Firm—Cushman, Darby & Cushman

[57] ABSTRACT

An exhaust gas purifier for purifying combustion gases of engines, the device comprising at least one composite sheet which is formed by sandwiching a catalyst coated sheet of cloth between a pair of supporting nets of heat resistive metal, the composite sheet being disposed in an exhaust pipe in a manner such that the exhaust gas flows in the direction of and along the surfaces of the composite sheet and that the gas contacts the catalyst sheet through the supporting net. The composite sheet(s) are shaped or disposed in a rolled sheet with spacer means to form gas flow path between its layers, or a set of coaxial tubes of the composite sheet disposed with spaces for gas-flow, or a set of parallel-disposed flat composite sheets with spaces for gas-flow. The device is advantageous in low resistivity for the gas flow.

11 Claims, 23 Drawing Figures

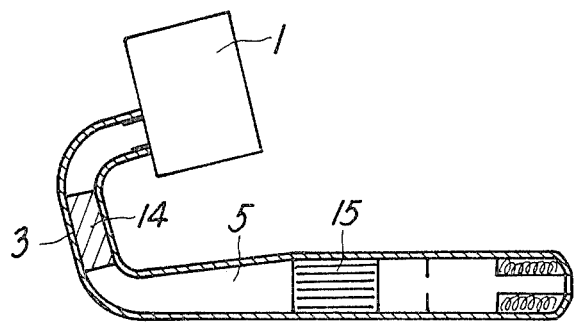
FIG. 5.
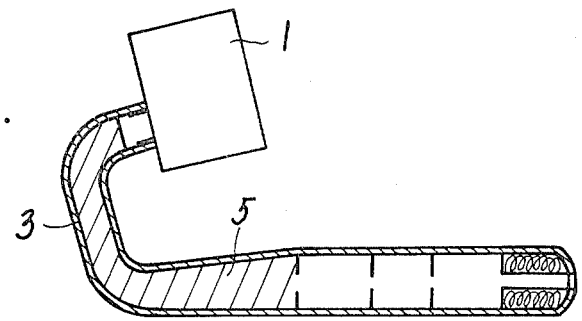
FIG. 6.
FIG. 7.
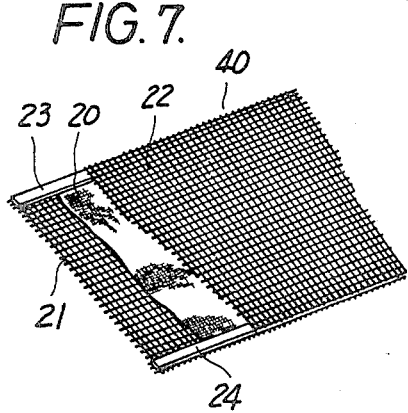
FIG. 8.
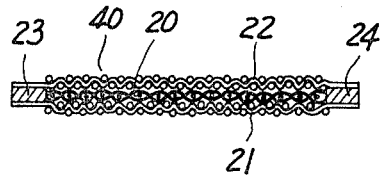
FIG. 9.
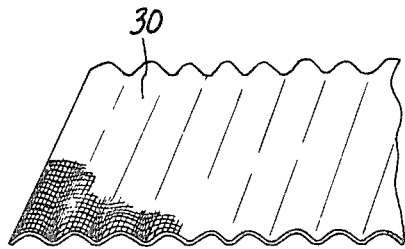

EXHAUST GAS CONTROL EQUIPMENT

This is a continuation of application Ser. No. 843,505 filed Oct. 18, 1977 and now abandoned.

BACKGROUND OF THE INVENTION

1. Field of the Invention

The present invention relates to exhaust gas control equipment for purifying combustion exhaust gases of internal combustion engines or external combustion engines of motor cars, motor trolleys, buses, motorcycles, motor carts for a factory, motor carts for golf players, motor snowmobiles, motor boat, locomotive, airplanes, and power stations or factories. The present invention also relates to exhaust gas control equipment for purifying exhaust gases of various factories by oxidation, reduction or decomposition of carbon monoxide, hydrocarbons, or oxides of nitrogen, etc.

2. Background of the Invention

In a conventional exhaust gas control equipment for purifying exhaust gas of internal combustion engines, a catalyst unit, which is disposed in an exhaust pipe or at the end of an exhaust pipe, comprises a honeycomb-shaped or grids-shaped ceramic block or granules mainly of alumina of several millimeter diameter as catalyst holder, which hold coatings of catalyst such as platinum, palladium, rhodium or mixture thereof. Such catalyst of the internal combustion engine is used in a under severe conditions. Especially in motor cars and in motorcycles, speed and load of engine vary very widely, for example among idling, acceleration, medium speed running, deceleration, climbing and high speed running. In some modes of such operation, temporarily a high concentration of hydrocarbon or carbon monoxide is exhausted into the exhaust controller. Therefore, by means of reaction therewith, the temperature of the catalyst is often raised to about 1000° C., thereby partly melting or breaking the catalyst holder because of heat shocks. Besides, mechanical vibration of the engine and repeated pressure shock in the exhaust gas is likely to break the honeycomb catalyst holder or cause attrition loss of the catalyst on granule holder. When the powder of the catalyst formed by the attrition is discharged from the exhaust pipe into the ambient atmosphere, dispersion of such catalyst powder also causes a further pollution to the environment. In order to improve such fragility of the catalyst unit, some proposals have been made by Harutoki Nakamura of Matsushita Electric Industrial Co., Ltd. to use the catalyst holder made with a cloth of a kind of glass fiber and are described in U.S. Pat. No. 3,897,366, No. 3,811,845, No. 3,929,671 and No. 3,956,185. In these prior descriptions, the cloths are used in a manner such that the exhaust gas passes vertically through the cloth. With such construction, the cloth receives great stress because of the mechanical shocks of the exhaust gas and accordingly the life time is not sufficiently long, and furthermore, the vertical passing of the exhaust gas through the cloth results in an adverse high back-pressure to the engine.

SUMMARY OF THE INVENTION

A first object of the present invention is to provide exhaust gas control equipment wherein resistance against gas flow, namely the back pressure against the engines, are low. Another object of the present invention is to provide a device which is strong and resists both the mechanical shock as well as the heat shock of the exhaust gas. Still another object of the present invention is to provide a device having a construction which is easy to manufacture.

BRIEF EXPLANATION OF THE DRAWING

FIGS. 2 to 6 are sectional side views of a muffler comprising therein exhaust gas control equipment embodying the present invention with side views of a two cycle engine connected therewith.

FIG. 7 is a fragmental perspective view of a composite sheet of the exhaust gas control equipment of the present invention.

FIG. 8 is a sectional front view of the composite sheet of FIG. 7.

FIG. 9 is a perspective view of the spacer used with the composite sheet of FIGS. 7 and 8.

DETAILED DESCRIPTION ON THE PREFERRED EMBODIMENTS

The exhaust gas control equipment of the present invention comprises at least one composite sheet formed by putting a catalyst coated sheet of cloth between a pair of supporting wire nets, the composite sheet being disposed in an exhaust pipe in a manner such that the exhaust gas flows in the direction of and along the surface of the composite sheet. The composite sheet is shaped into a rolled sheet with a spacer means between layers of the composite sheet, or composite sheets are shaped into a set of coaxial tubes with gas flow spaces inbetween, or a set of composite sheets are disposed in parallel spaced relationship with gas flow spaces inbetween. The spacer disposed in the rolled sheet forms gas flow spaces along the composite sheet.

The catalyst coated cloth can be formed in accordance with at least one of the disclosures of the U.S. Pat. No. 3,897,366, No. 3,811,845, No. 3,929,671 and No. 3,956,185. Namely, a heat-resistive glass fibre cloth is coated by catalyst metal, for example, platinum, palladium, rhodium or mixture thereof. The catalyst sheet is put between a pair of metal net of heat resisting and chemically stable metal. The metal net includes nets made of metal wires, a perforated metal sheet, punched metal sheet or expanded metal sheet. In order to confine and hold the catalyst sheet, the edges of the upper net and lower net are connected via metal strips which are put between the upper and lower nets at the edges. The edges of the net are spot welded on both faces of the metal strip. The composite sheet is formed into long belt shape and is rolled with a spacer between layers of the sheet. Another example is that the composite sheet is formed in several tubes of various diameters and the tubes are coaxially held by a cross-shaped holder. Still another example is that the composite sheet is formed in a plate, and many composite sheets are held in parallel spaced relationship by a holder with specified gap spaces inbetween. In still another example, the composite sheet is formed in a tube or a frustum of cone and the single tube or frustum of cone is secured inside an exhaust pipe. The abovementioned metal strips reinforce the edges of the composite sheet and therefore, the composite sheet can resist the mechanical shock by vibration of the engine.

Hereafter, the present invention is described on preferred examples applied to a motorcycle.

Figure 1:
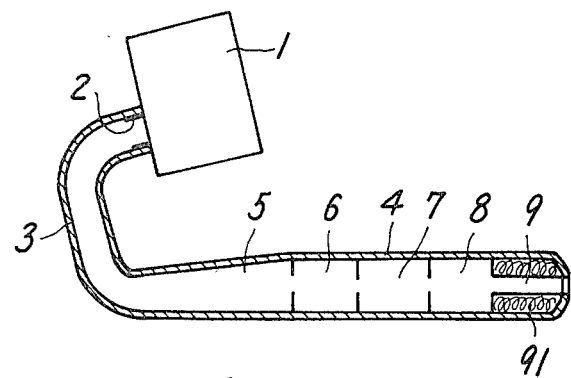
FIG. 1 is a sectional side view of a muffler with a side view of a two-cycle engine connected therewith.

FIG. 1 shows construction of ordinary exhaust pipe 3 and muffler 4 which are connected to the exhaust port 2 of a two-cycle type engine 1 with exhaust gas volume of 500 cc. The muffler 4 comprises a first expansion chamber 5, a second expansion chamber 6, a third expansion chamber 7 and a fourth expansion chamber 8, which are disposed in series relation and in the downstream relation with the exhaust pipe 3, and a damper 9 having a chamber filled with glass-fibers 91 is disposed at the end part.

Figure 2:
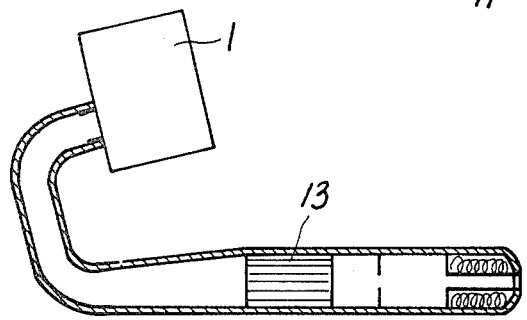
Figure 10A:
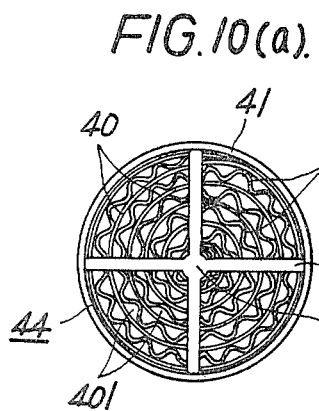
FIG. 10a and FIG. 10b are a front view and a fragmental side view, respectively, of a rolled sheet type exhaust gas control equipment the present invention.
Figure 10B:
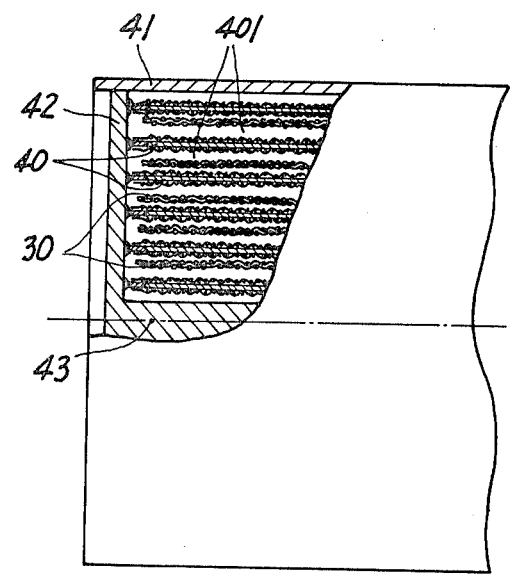

EXAMPLE 1:

FIG. 2 shows a first example, wherein a catalyst unit 13 in accordance with the present invention is installed in the space of the second and third expansion chambers 6 and 7. The catalyst unit 13 comprises a roll 44 of rolled composite sheet 40 of the construction shown in FIG. 10a and FIG. 10b. The roll 44 comprises a spacer 30 of a heat-resisting metal with wave form corrugation disposed between the layers of the composite sheet 40, and the roll is inserted and held in a tubular case 41 with cross-shaped end holders 42. The composite sheet 40 is constructed as shown by FIG. 7 and FIG. 8, wherein the upper wire net 22 and the lower wire net 21 hold a sheet 20 of cloth type 100 mm width catalyst belt inbetween. The wire nets are heat resisting stainless steel net of 12 mesh, woven with wires of 0.5 mm diameter of stainless steel of AISI No. 304 (No. 304 in the standard of the American Iron and Steel Institute), and shaped in belts of 110 mm width. At both side edges of the belt shaped nets, 5 mm width and 0.6 mm thick strips 23 and 24 are disposed between the upper net 22 and the lower net 21, and edges of the upper net 22 and the lower net 21 are spot welded onto the strips 23 and 24 thereby forming a lengthy bag of wire net. The spacer 30 shown in FIG. 9 is a corrugated net belt of 110 mm width made of wave-like corrugated 8 mesh net woven with 0.5 mm diameter wire of AISI No. 304 stainless steel. The composite sheet 40 and the spacer 30 are superposed each other and wound for 12 turns to form the roll 44 of FIG. 10a and FIG. 10b having the outer diameter of 100 mm. The height and wave length of the wave of the spacer 30 are 4 mm and 10 mm, respectively. As shown in FIG. 10a and FIG. 10b, the catalyst unit manufactured in the abovementioned way has many spaces, i.e., gas flow paths in the direction of axis of the unit 13, namely the axis of the muffler 4.

Figure 17:
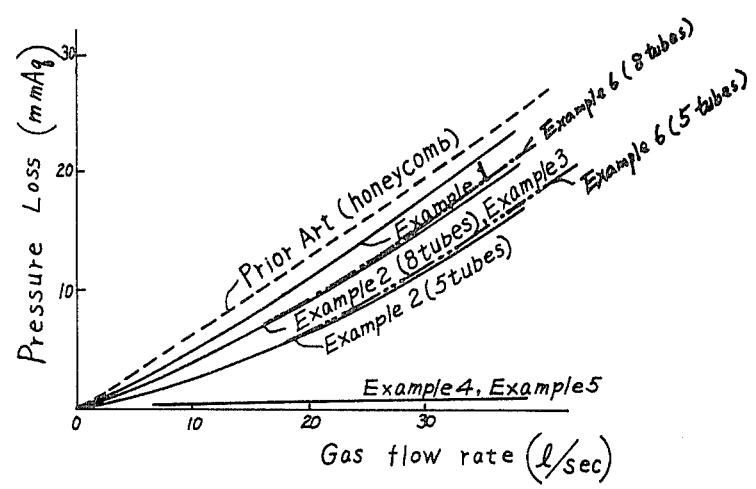
FIG. 17 is a graph showing curves of the relation between the gas flow rate and pressure loss of examples of the present invention and the prior art.
Figure 18:
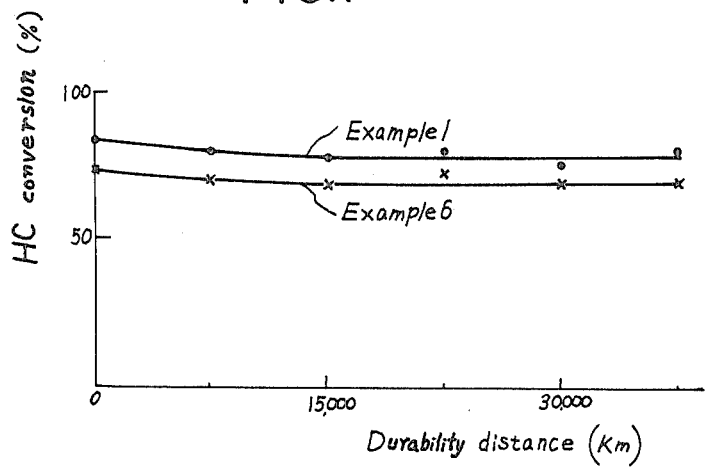
FIG. 18 is a graph showing curves of the relation between durability distance and the hydrocarbon conversion (in %) of the examples of the present invention.

Test results are shown in the graphs of FIG. 17 and FIG. 18 and in the belowmentioned Table.

Figure 11A:
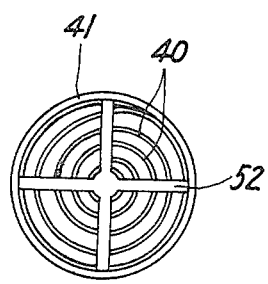
FIG. 11a and FIG. 11b are a front view and a fragmental side view, respectively, of another rolled sheet type exhaust gas control equipment of the present invention.
Figure 11B:
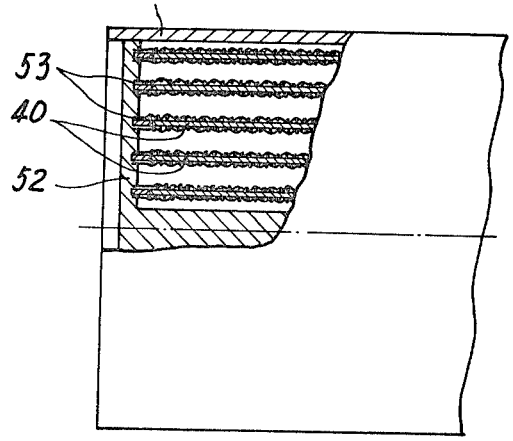

Another method of manufacturing a space-containing rolled sheet of catalyst is that the composite sheet 40 is wound into a roll being superposed with a corrugated cardboard as a temporary spacer between layers. Then as shown in FIG. 10a and in FIG. 11b, the roll 44 is rigidly fixed in the case 41, and the side edges of the roll 44 inserted in indents 53 of the end holders 52. The case 41 and the end holders 52 are welded each other, and subsequently, the corrugated cardboard is burnt away, thereby forming a gas flow spaces between the layers of the composite sheet.

EXAMPLE 2

Figure 13A:
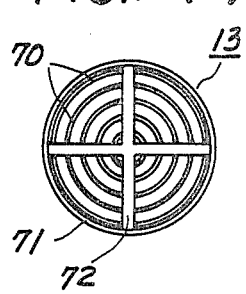
FIG. 13a and FIG. 13b are a front view and a fragmental side view, respectively, of coaxial-tube type exhaust gas control equipment of the present invention comprising the tubular composite sheets shown in FIG. 12a and FIG. 12b.
Figure 13B:
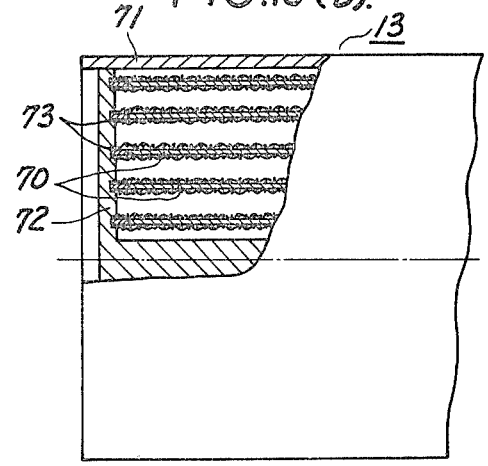

A coaxial tube type catalyst unit shown in FIG. 13a and FIG. 13b is installed as the catalyst unit 13 of FIG. 2. The coaxial tube type catalyst unit is made by forming the composite sheet 40 of FIG. 7 and FIG. 8 into tubes 70, 70—of various diameters. The tubes are installed in a case 71 and are coaxially fixed by inserting and welding their end edges into indents 73 on cross shaped end holders 72. The case 71 and the end holders 72 are fixed by welding.

Figure 12A:
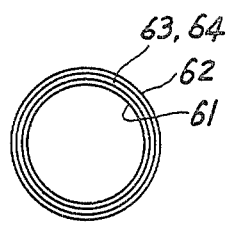
FIG. 12a and FIG. 12b are a front view and a side view, respectively, of a tubular composite sheet.
Figure 12B:
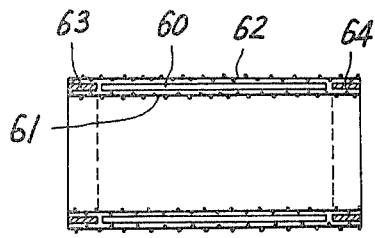

In another embodiment illustrated in FIG. 12a and FIG. 12b, the tube of composite sheet is made by spot welding a pair of rings 63 and 64 of stainless steel of AISI No. 304 of 5 mm width and 1 mm thickness on outside edges of a 100 mm long tube of inner wire net 61 of 8 mesh woven with AISI No. 304 stainless steel wire of 0.5 mm diameter. Then on the outer face of the wire net tube 61 and between the rings 63 and 64, a catalyst cloth coated sheet 60 is wound twice to form a double layers thereof. Finally, outer wire net 62 of the same net as the inner wire net 61 is wound around the outside face of the catalyst sheet 60, and the edge parts of the outer wire net 62 are spot welded on the outer faces of the rings 63 and 64.

As belowmentioned, tubular composite sheets of various diameters are made and are coaxially fixed by the holders 72 which are welded on a case 71 as shown in FIG. 13a and FIG. 13b thereby forming coaxial tube type catalyst unit.

The belowmentioned two coaxial type catalyst units, a 5-tube type unit and 8-tube type unit, are made as follows:

(1) 5-tube type catalyst unit:
overall length of the catalyst unit . . . 110 mm
outer diameter of the catalyst unit . . . 100 mm
outer diameters of the tubular composite sheets
   outmost tube . . . 99 mm
   second tube . . . 79 mm
   third tube . . . 59 mm
   fourth tube . . . 39 mm
   inmost tube . . . 19 mm.

(2) 8-tube type catalyst unit:
overall length of the catalyst unit . . . 110 mm
outer diameter of the catalyst unit . . . 100 mm
outer diameters of the tubular composite sheets
   outmost tube . . . 99 mm
   second tube . . . 86 mm third tube . . . 73 mm
fourth tube . . . 60 mm
fifth tube . . . 47 mm
sixth tube . . . 34 mm
seventh tube . . . 22 mm
inmost tube . . . 9 mm.

As shown in FIG. 13a and FIG. 13b, the catalyst unit manufactured in the abovementioned way has many spaces, i.e., gas flow paths in the direction parallel with the axis of the unit 13, namely the axis of the muffler 4.

Test results are shown in the graph of FIG. 17 and the belowmentioned table.

EXAMPLE 3

Figure 14:
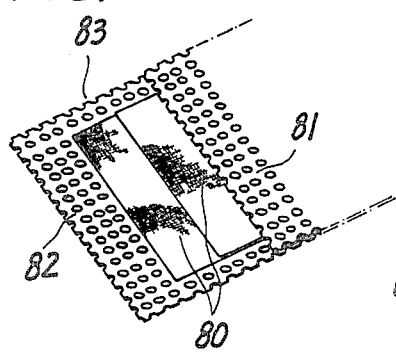
FIG. 14 is a fragmental perspective view of another composite sheet of the exhaust gas control equipment of the present invention.
Figure 15A:
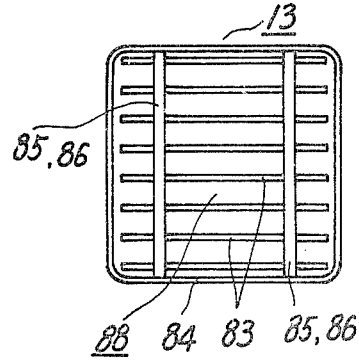
FIG. 15a and FIG. 15b are a front view and a fragmental side view, respectively, of a parallel sheet type exhaust gas control equipment of the present invention comprising the composite sheet of FIG. 14.
Figure 15B:
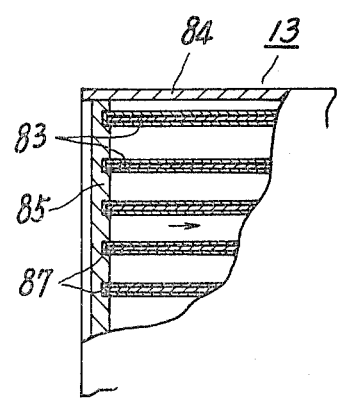

A parallel flat sheets type catalyst unit shown in FIG. 15a and in FIG. 15b is installed as the catalyst unit 13 of FIG. 2. The parallel flat sheets type catalyst unit shown in FIGS. 15a and 15b comprises a specified number of flat sheet type composite sheets 83 shown in FIG. 14, parallelly disposed, with gas flow space inbetween, in a rectangular case 84 with its front and rear end edges inserted and welds in the indents 87 of cross-shaped front and rear holders 85 and 86, respectively. The gas flow space and the faces of the composite sheets 83 are made in the direction parallel with the axis of the muffler 4. The bar-shaped front and rear holders 85 and 86 are welded on the rectangular frame 84.

The composite sheets 83 are made as follows:

Two rectangular catalyst coated cloth sheets 80, 80, . . . of 80 mm width and 100 mm length are superposed each other, and the two sheets are put between a pair of punched metal sheets 81 and 82 of 90 mm width, 110 mm length and 0.3 mm thickness which function as supporting nets as shown in FIG. 14. The punched metal sheets 81 and 82 are made with a AISI No. 304 stainless steel sheet and are perforated in a manner such that total area of the perforations is 50% of the area of the sheet. The edges of the punched metal sheets 81 and 82 are spot welded on each other thereby fixing the catalyst sheet therein. Sixteen of the composite sheets 83 illustrated in FIG. 14 are installed and fixed on a rectangular frame 84 of:

the overall length . . . 120 mm
height . . . 95 mm
width . . . 95 mm
pitch of the composite sheet . . . 7 mm
(space between two composite sheets . . . about 4 mm).

As shown in FIG. 15a and FIG. 15b, the catalyst unit manufactured in the abovementioned way has many spaces, i.e., gas flow paths in the direction parallel with the axis of the muffler 4.

Tests results are shown in the graph of FIG. 17 and in the belowmentioned table.

EXAMPLE 4

Figure 3:
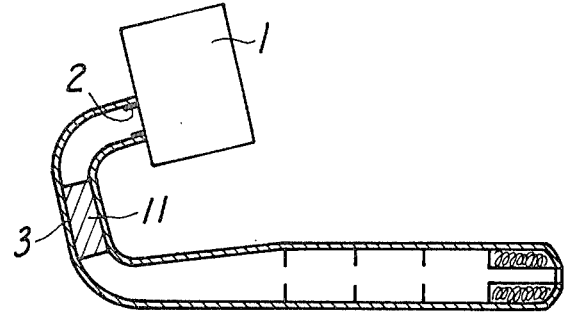

A coaxial tube type catalyst unit, made similarly with the method and construction of Example 2 shown in FIG. 13a and FIG. 13b, is installed in the exhaust pipe 3 as the catalyst unit 11 of FIG. 3. The outer diameter of the coaxial type catalyst unit is 34.5 mm to 35 mm in order to be fit in the exhaust pipe having an inner diameter of 35 mm. The overall length of the unit is 100 mm.

The following two types of the examples are made:
(1) with single tube of composite sheet having diameter of . . . 33.5 mm,
(2) with two coaxial tubes of composite sheet, having diameter of the outer tube . . . 33.5 mm
diameter of the inner tube . . . 17.5 mm.

Test results are shown in the graph of FIG. 17 and in the belowmentioned table.

EXAMPLE 5

Figure 4:
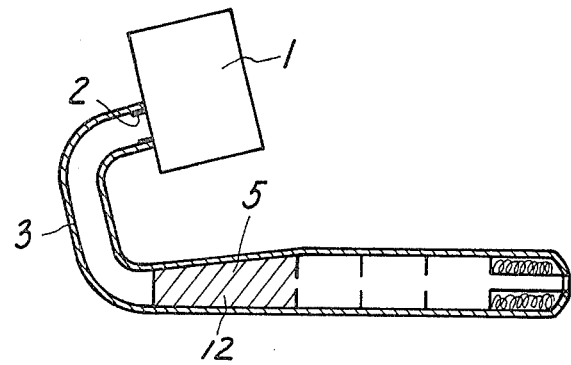
Figure 16:
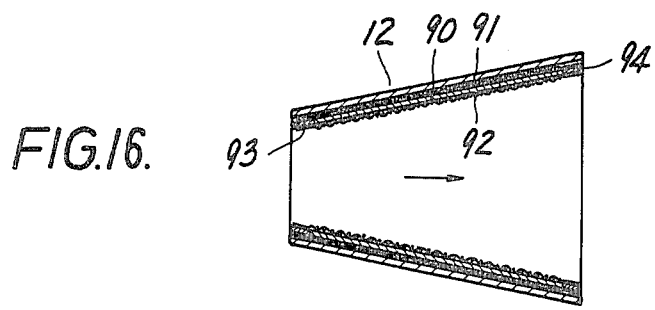
FIG. 16 is a sectional side view of a frustum of a cone type exhaust gas control equipment of the present invention.

A single frustum-of-cone type catalyst unit 12 shown in FIG. 16 is installed in the first expansion chamber 5 of the muffler 4 as shown in FIG. 4.

The composite sheet shaped in the frustum of cone has:
length of . . . 200 mm
outer diameter of the input end . . . 34 mm
outer diameter of the output end . . . 100 mm.

The construction and making method of the catalyst unit 12 is similar to those of Example 2. A catalyst-coated cloth sheet 90 is put between 8 mesh nets of wires of 0.5 mm diameter stainless steel of AISI No. 304, and a pair of rings 93 and 94 of the stainless steel are inserted between edges of the inner net 92 and the outer net 91, and the edges are spot welded on the rings 93 and 94. The catalyst unit is inserted in the first expansion chamber 5 of the muffler 4 and is fixed thereto by spot welding the net of the output end part on the inner face of the muffler 4.

Test results are shown in the graph of FIG. 17 and the belowmentioned table.

EXAMPLE 6

Plural number of the catalyst units are installed in series in the muffler 4, as shown in FIG. 5. Namely, in the upperstream part, i.e., in the exhaust pipe 3 the coaxial catalyst unit 14 of the construction shown in Example 4, and in the downstream part, i.e., in the second and third expansion chambers 6–7, the coaxial type catalyst unit 15 of the construction shown in Example 2 is installed.

As a modification, the roll type catalyst unit of Example 1 or the parallel flat sheet type catalyst unit of Example 3 can be used and the similar results are obtained.

Test results are shown in the graphs of FIG. 17 and FIG. 18 and in the belowmentioned table.

FIG. 17 shows relations between gas flow rate (liter/second) and Pressure loss (mm H$_2$O) by the exhaust gas cleaning devices. The broken line indicates the characteristic curve of the honeycomb type monolith catalyst of the prior art and other solid curves indicate characteristics of the examples mentioned on the curves. As shown by the curves, all of the embodiments of the present invention have smaller pressure loss (namely, smaller resistance against gas flow) than the honeycomb type monolith catalyst of the prior art.

FIG. 18 shows relation between durability distance (Km) and conversion (%) for hydrocarbon of the devices of Example 1 and Example 6 in comparison with an exhaust gas without cleaning by any exhaust gas cleaning device. The measurements are made by an engine dynamometer under the "1975 Federal Test Procedure" issued by the U.S. Environmental Protection Agency, for a motorcycle with a 500 cc 2 cycle engine. Both curves of FIG. 18 show that almost no deterioration of the exhaust gas control equipment of the present invention takes place. Other examples show similar stable characteristic.

The belowmentioned table shows characteristics of the Examples. The characteristics include "HC conversion (%)", "the highest temperature of the catalyst (°C.)" and "destruction by misfiring". The "HC conversion" of the devices of the Examples are conversions for hydrocarbon in an exhaust pipe without any gas-cleaning device.

| Example number | HC conversion (%) | the highest temperature of the catalyst (°C.) | destruction by misfiring |
|---|---|---|---|
| 1 8 tubes | 85...90 | 850 | none |
| 2 5 tubes | 80...85 | 800 | none |
| 3 | 65...70 | 700 | |
| 4 | 80...85 | 800 | none |
| 5 | 20...25 | 500 | none |
| 6 | 30...35 | 400 | none |
| The prior Art, (honeycomb) type | 75...80 | 700 | none |
| | 80...85 | 850 | a part of upstream end is melted |

The "HC conversion" in the table are measured by an engine dynamometer under the "1975 Federal Test Procedure" ruled by the U.S. Environmental Protection Agency for a motor bicycle with a 500 cc 2 cycle engine. "The highest temperature of the catalyst" is measured during the abovementioned test. "Destruction by misfiring" is tested by generating a misfiring by cutting off the ignition circuit and driving for 5 minutes thereafter to make misfiring condition.

The table proves that the examples of the present invention shows satisfactory stable characteristic.

As a further modification, the catalyst unit can be installed continuously from the exhaust pipe part 3 to the first expansion chamber 5, as shown in FIG. 6.

As a still another modification, the coaxial catalyst unit can be installed in the exhaust pipe 3 in a manner such that the outer face of the catalyst unit is made of a net or perforated sheet and the outer face of the catalyst unit does not contact the inner face of the exhaust pipe with a tubular gas flow path inbetween.

Throughout the catalyst coated examples of the invention, the cloth sheet is not limited to a single layer of sheet, but can be a mat made by superposing several sheets (i.e. piling up several sheets) of the catalyst or a mat of a non-woven cloth.

The nets used to sandwich the catalyst sheet is not limited to wire nets but can include the abovementioned perforated metal sheets, or any other metal sheets having a rate of perforated area against the sheet area of over 20%. For example, known expanded metal can also be used as net. For the material of the net, any stainless steel other than the AISI No. 304 stainless steel can be used if the material can resist a high temperature, mechanical and heat shocks of the exhaust gas and chemically stable against corrosion in the exhaust gas.

Any kind of catalyst for treating the exhaust gas can be used for the catalyst sheet of the present invention.

When the roll is densely wound, the reinforcing or sandwiching net can be dispensed with. Namely, the rolled sheet type catalyst unit can be made by simply winding a belt of the catalyst coated cloth sheet together with a belt of corrugated spacer net, thereby utilizing the corrugated spacer net also as the reinforcing net.

The holder which holds the composite sheets in the frame or in the exhaust pipe can be situated not only at the front and rear end parts, but also can be situated at the inside parts of the case thereby penetrating the composite sheets or on one end part.

What we claim is:

1. An internal combustion engine exhaust gas catalyst unit comprising an exhaust gas casing having an inlet means and an outlet means with a cylindrical catalyst assembly filling the space between said inlet means and said outlet means, said inlet means and said outlet means both disposed in a direction substantially parallel to the direction of exhaust gas flow through the inside space of said casing to define an exhaust gas flow path along the axial direction of said cylindrical catalyst assembly; and
   a cylindrical catalyst assembly comprising at least one roll of composite sheet which comprises at least one catalyst-coated sheet of heat resistant glass fiber cloth retained between a pair of heat resistant supporting metal nets, the side edges of both metal nets being secured together by a pair of metal retaining and reinforcing strips inserted therebetween and secured to the edges of the opposing faces of said metal nets, said strips and metal nets retaining and protecting the catalyst-coated sheet against mechanical shock, said catalyst assembly in the form of a roll defining a cylinder having a plurality of exhaust gas flow paths in the axial direction of said cylindrical catalyst assembly to provide exhaust gas flow in the direction and along the surface of said composite sheet.

2. The exhaust gas purifier as claimed in claim 1 wherein said catalyst-coated sheet is a woven cloth.

3. The exhaust gas purifier as claimed in claim 1 wherein said catalyst-coated sheet is nonwoven.

4. The exhaust gas purifier as claimed in claim 1 further including retaining means disposed at least at one of the ends of said composite sheet.

5. The exhaust gas purifier as claimed in claim 4 wherein said retaining means is secured to said casing.

6. The exhaust gas purifier as claimed in claim 1 wherein said composite sheet of catalyst-coated cloth and supporting metal nets are in the form of a roll wound at least two turns, each winding of said composite sheet spaced a predetermined distance apart from the next adjacent winding.

7. The exhaust gas purifier as claimed in claim 6 wherein said composite sheet includes a corrugated spacing means adjacent at least one of said metal nets and in the form of a roll, said spacing means defining said predetermined distance between the adjacent windings.

8. The exhaust gas purifier as claimed in claim 7 wherein said spacing means is a corrugated wire mesh.

9. The exhaust gas purifier as claimed in claim 1 wherein said composite sheet is in the form of a hollow tube.

10. The exhaust gas purifier as claimed in claim 9 wherein said catalyst assembly comprises a plurality of concentric, hollow tubes of decreasing diameter positioned one inside the other, each tube retained coaxially spaced apart from the next adjacent tube a predetermined distance forming a plurality of exhaust gas flow paths therebetween.

11. The exhaust gas purifier as claimed in claim 10 further including a plurality of concentric indents at both ends of said casing, said indents spaced a predetermined distance apart from each other to receive a cooperatively shaped tube and retain same in position to define a plurality of exhaust gas flow paths therebetween.

* * * * *